Aug. 23, 1966    G. A. PRITCHARD ETAL    3,267,902
IMPREGNATING AND COATING APPARATUS
Filed July 15, 1963    3 Sheets-Sheet 2
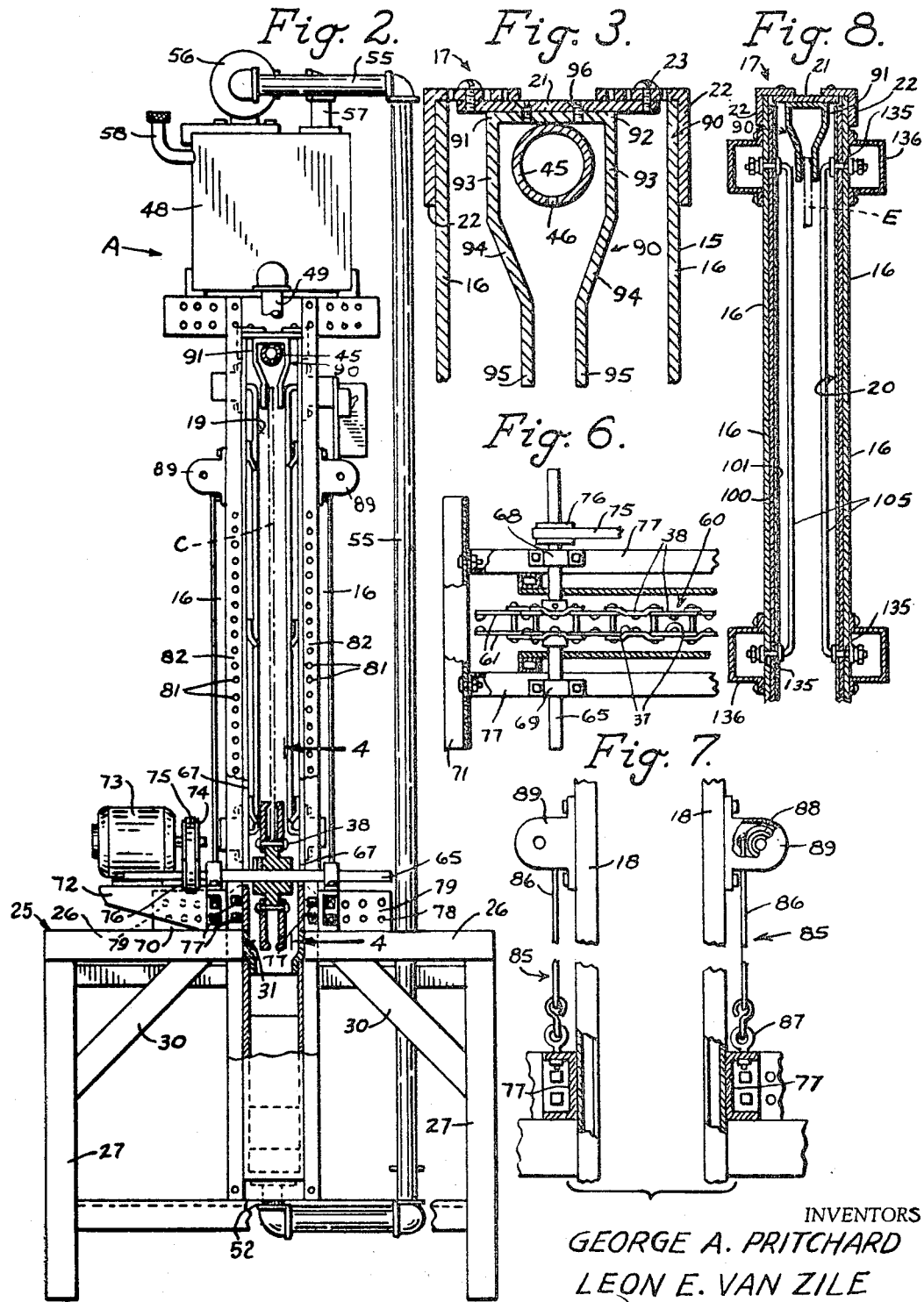
INVENTORS
GEORGE A. PRITCHARD
LEON E. VAN ZILE
BY
ATTORNEYS

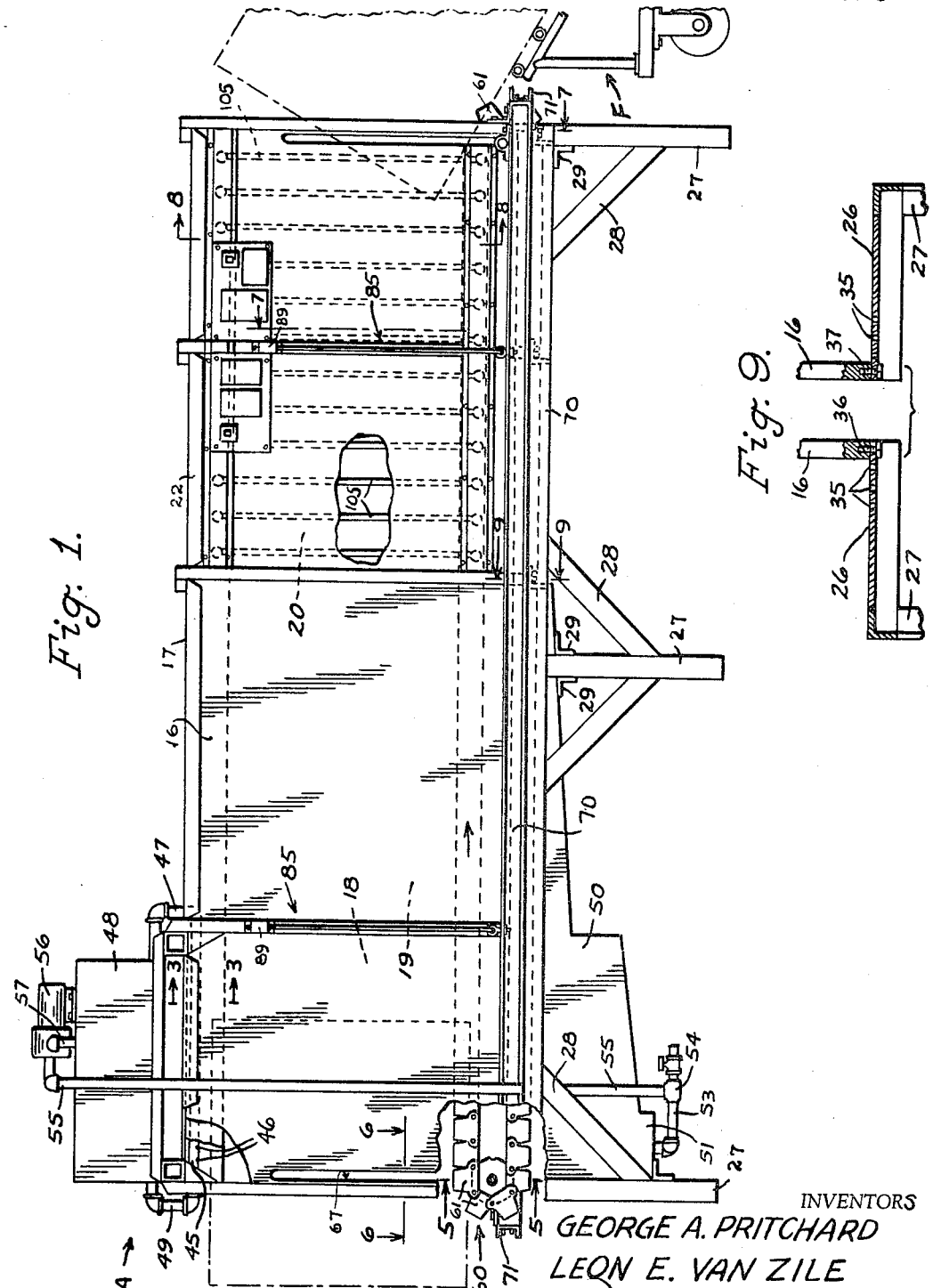

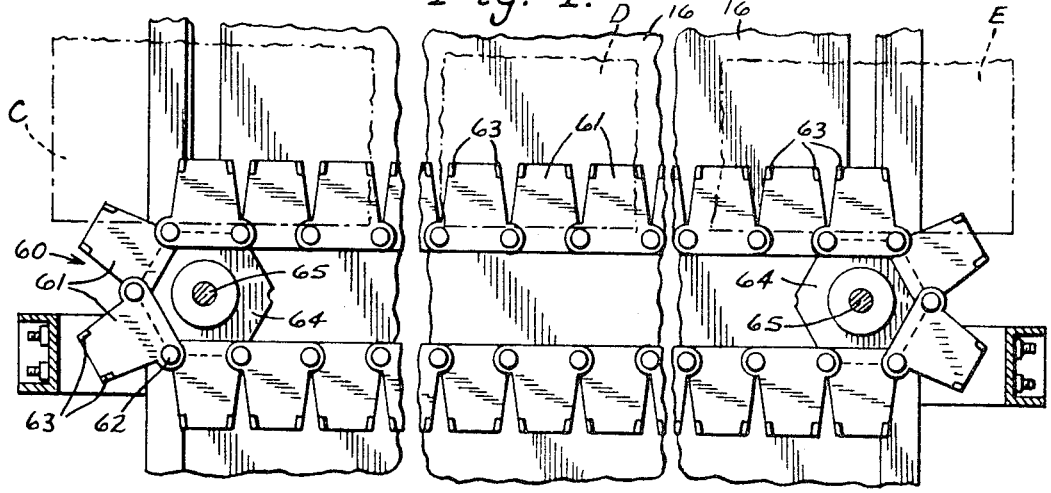
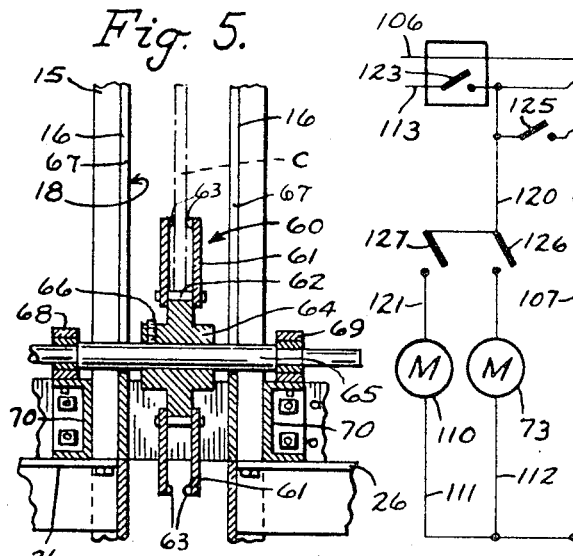
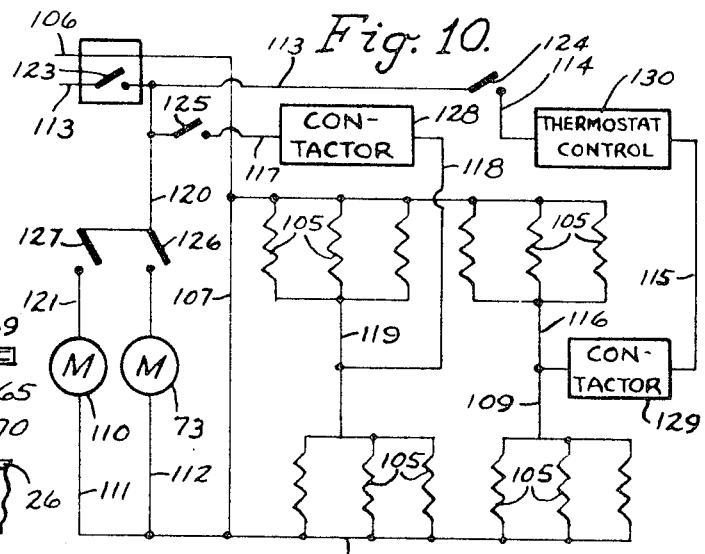
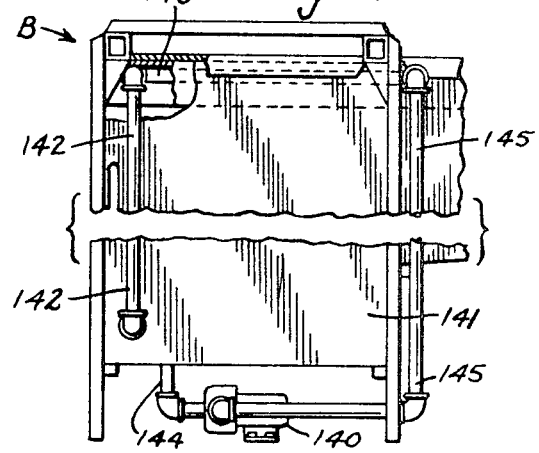

United States Patent Office 3,267,902
Patented August 23, 1966

3,267,902
IMPREGNATING AND COATING APPARATUS
George A. Pritchard and Leon E. Van Zile, both of 303 10th St., Atlantic Beach, Fla.
Filed July 15, 1963, Ser. No. 294,902
6 Claims. (Cl. 118—642)

This invention relates to apparatus for the processing of sections of material to be employed as water-resistant, waterproof, insecticide-treated or like coverings or containers. One example of such sections of material is corrugated board adapted to be fashioned into boxes for containing damp food products or iced food products, such as lettuce, for instance, or cut flowers, or damp material used around articles within the treated container.

An important object of the invention is to provide apparatus for coating or impregnating spaced-apart sections of material, such as in sheet form, with a water-repellant fluid material, drip-drying the impregnated sections, heat-drying the drip-dried sections, and delivering the heat-dried sections to a delivery station, employing a single housing and a single dual-function conveyor and fluid material baffle means for receiving sections of material to be coated or impregnated, one after another, and conveying them from one end of the apparatus to the other end thereof, this conveyor having means to baffle or direct fluid material flowing or dripping from the lower portions of the section, to a reservoir or sump and, at the same time, tending to prevent backward movements of the spaced-apart sections upon the moving conveyor.

Another important object of the invention is to provide apparatus for coating or impregnating spaced-apart sections of material, such as in sheet form, with a water-repellant fluid material, drip-drying the impregnated sections, heat-drying the drip-dried sections, and delivering the heat-dried sections to a delivery station, employing a single housing and a single dual-function guide or orienting and baffle means for orienting and preventing canting of sections of material, to be coated or impregnated, from the receiving end of the apparatus to the discharge end thereof and to baffle impregnating or coating fluid so it will effectively coat and/or impregnate the sections of material and the coating fluid will not be dissipated upon the walls of the apparatus.

A further important object of the invention is to provide means for receiving coating or impregnating liquid, dripping from the sections of material passing through the apparatus and recycling the drippings to spray means associated with the guide or orienting and baffle means described above and later detailed in this specification.

An additional important object of the invention is to provide a portion of the apparatus for heat-drying the impregnated or coated sections of material while retained by the guide or orienting and baffle means as described above.

A further important object of the invention is to provide means to render the apparatus adapted to process sections (as sheets) of material having areas of various sizes.

Additionally, an important object of the invention is to process sections of material which have different characteristics of porosity which would require different degrees of heat drying of the impregnating material, or which have water-resistant coatings of different thicknesses.

Still an additional important object of the invention is to provide appaartus which will occupy a very narrow space for setting up and operating and into which the material to be processed may be fed manually, thus reducing the number of operators. Since there are no complicated manual operations to be undertaken, unskilled labor may operate the apparatus.

Other objects and advantages of the invention will be apparent during the course of the following detailed description of the invention, taken in connection with the accompanying drawings, forming portions of this disclosure, and in which drawings:

FIG. 1 is a side elevational view of an example of the apparatus of this invention, a portion being broken away in order to disclose elements underneath, and showing material, in dot-and-dash lines, entering and leaving the apparatus.

FIG. 2 is a material-receiving end elevational view of the apparatus of FIG. 1, but on an enlarged scale.

FIG. 3 is a vertical transverse sectional view substantially on the line 3—3 of FIG. 1, but on an enlarged scale.

FIG. 4 is a fragmentary vertical longitudinal sectional view, substantially on the line 4—4 of FIG. 2 but on an enlarged scale.

FIG. 5 is a vertical transverse sectional view, substantially on the line 5—5 of FIG. 1 but on an enlarged scale.

FIG. 6 is a horizontal longitudinal sectional view, substantially on the line 6—6 of FIG. 1.

FIG. 7 is a vertical transverse sectional view, substantially on the line 7—7 of FIG. 1, somewhat enlarged thereover.

FIGS. 8 and 9 are vertical transverse sectional views, substantially on their respective lines of FIG. 1.

FIG. 10 is an electrical wiring diagram of electrical means forming parts of the apparatus of FIG. 1.

FIG. 11 is a fragmentary receiving-end elevational view of a modified form of apparatus of the invention.

In the drawings, wherein for the purpose of illustration are shown two forms of the invention, the letter A designates one form, and B, a second form; C, sections of material to be processed by the apparatus of the invention; D, sections of material under processing; E, a processed section; and F, an example of processed sheets-receiving conveyance.

The apparatus of FIGS. 1 to 10 inclusive includes a housing 15, best shown in FIGS. 1, 7 and 8, having upstanding side walls 16, substantially in parallelism, and a sectional top wall 17 bridging the side walls. Preferably, there are no end walls. In FIG. 1, the left-hand end of the housing is the receiving end for material to be processed, and the right-hand end is the processed material discharge end.

The walls 16 and 17 define three compartments or chambers, comprising (as arranged from left to right in FIG. 1) an impregnating or coating material-spraying compartment 18, a drip-drying compartment 19, and a heat-drying compartment 20.

Since we prefer to provide a housing which may be widened transversely, and we desire to provide a practical top wall to cooperate therewith, the top wall may be in sections comprising a central top wall section 21 and two flanged auxiliary top wall sections 22 each having a portion overlapping the central top wall section and a depending flange in face contact with the outer faces of the side walls, as best shown in FIG. 3. The flanged sections 22 may be adjustably attached to the central section 21 as by screws 23, or the like, with the shanks thereof adapted to extend through axially aligned holes in the sections 21 and 22, whereby the top wall may be widened or narrowed.

Supporting the housing 15 is a preferably raised base 25, including a horizontal base top 26 and a plurality of legs 27, connected to the base top. Suitable braces, such as the braces 28, 29 and 30 may be provided. The raised base preferably comprises two sections, in the same horizontal plane, but longitudinally spaced apart, whereby their facing inner edges define a longitudinal slot 31, which provides a longitudinal passageway for portions of an endless conveyor chain 60, a passageway for excess impregnating or coating material to drop therethrough from the compartment 18, a passageway for the additional excess impregnating or coating material dripping from the sections of material under processing, to drop therethrough while in the compartment 19, and a passageway for ventilation, whereby volatile portions of the impregnating or coating material, driven off by the heat in the compartment 20, will be urged to emerge from the housing 16 at the discharge end thereof. The various braces may be welded to associated portions of the legs of the base 25.

Since materials (as sheets C, for example) to be processed may be of various conditions of porosity and the like, we prefer to provide means to vary the widths of the walls 16 and 17 and to also maintain the walls against collapse. Such means may be a plurality of rows of spaced-apart perforations 35 (FIG. 9) in the base top 26 to receive the shanks of screws 36 for mating with the screw threads of sockets 37 in the side walls 16 extending upwardly from their lower edges. The walls 16 may be adjusted thereby as to their distance apart.

Means to discharge impregnating or coating materials, in liquid form, or partly in liquid and partly in solid (as provided) forms, preferably includes a horizontally disposed conduit 45 extending the length of the impregnating or coating compartment 18 and having a plurality of spaced-apart downwardly opening mouths 46 for the discharge of impregnating or coating material. The end of the conduit, adjacent the entrance to the drip dry compartment 19, is provided with an imperforate conduit section 47 opening to a suitable tank or reservoir 48 and the opposite end of the conduit 45, at the entrance to the compartment 18, is also provided with an imperforate conduit section 49 also opening to the tank or reservoir 48, which latter may be carried by the top wall section 21.

In order to recycle impregnating or coating material, in the form A of this invention, I prefer to provide a receptacle 50 disposed below the base top 21, having an upwardly opening mouth aligned with the slot 31 where it extends below the compartments 18 and 19. It will be noted that the bottom of the receptacle 50 is shown in FIG. 1 as sloping downwardly from the vertical plane of the right hand end of the drip-dry compartment to the vertical plane of the inner end of the impregnating or coating compartment and then there is an abrupt drop in the bottom, with a sump 51 at, preferably, the end of the entrance end of the housing 15. Opening into the sump 51 is a conduit 52 which may lead to a valved outlet 53, for draining the receptacle if desired, with a T-conduit coupling 54 interposed in the conduit 52. A conduit 55 opens into the coupling 54 and extends upwardly to enter the intake side of an electric motor-operated pump 56 which may be mounted upon the roof of the tank or reservoir 48. From the outlet side of the pump 56, a conduit 57 extends to and opens into the tank or reservoir 48. In order to charge the tank or reservoir 48 with the impregnating or coating material, we provide a suitable intake port in the top wall of the tank or reservoir, with a closure 58 therefor.

Impregnating or coating material is discharged downwardly to impinge upon the sections C of material moving through the impregnating or coating compartment 18. If the sections C are of porous material, they will be impregnated and coated; if of corrugated board, they will be impregnated and coated, including the central corrugated portions; and if of non-porous material, they will be coated.

Endless conveyor means, best shown in FIGS. 4, 5 and 6, includes an endless conveyor chain 60, made up of a plurality of links 61 comprising plates which may be of resilient material, with side edges converging from the pivotal connections of the plates (by pivot elements, as pins 62) to one another, substantially as shown in FIG. 4. Preferably, the pins are of relatively small diameter whereby there is considerable clearance between adjacent pins, as may be appreciated from FIG. 6.

Adjacent the narrower ends of the plates or links 61, remote from their pivotal connections, are spaced apart inwardly extending lugs 63 adapted to lightly engage the sections of material undergoing processing, whereby the sections will not tend to move independently of the movements of the conveyor or cant out of the vertical. The links or plates 61 also function to guide or baffle drip of impregnating or coating liquid from the sections so that it will fall into a reservoir below the conveyor and not spatter upon the walls 16. The lugs 63 may be of resilient material, such as rubber, if desired, since either they or the material of the plates or links, or both, should have a degree of resiliency.

The endless conveyor chain 60 is trained over a pair of suitable sprocket wheels 64 disposed adjacent the entrance and discharge ends of the housing 15. The end elevation of one is shown in FIGS. 1 and 4, with its periphery represented by a plurality of flattened link-contacting faces separated by pivot pin-contacting grooves. The wheels 64 are carried by shafts 65 to which the wheels may be detachably secured as by set screws 66 (one being shown by way of example in FIG. 5). The shafts 64 extend into vertically extending slots 67 in the side walls 16, and project outwardly thereof, whereby the shafts and the sprocket wheels may be elevated or lowered. The shafts are rotatably carried by bearings 68 and 69. The bearings are carried by elongated horizontal supports 70, such as channel irons, extending the length of the housing 15 and which are adjustably joined by end supports or braces 71, which may also be channel irons. The supports 70 are also adapted to adjustably support a base 72 for means for rotation of the shafts 65, such means preferably being an electric motor 73, with its shaft carrying a pulley 74 with belt 75 trained thereover and also trained over a pulley 76 mounted upon the shaft 65 for rotation thereof.

Positioning means for adjustably positioning the supports 70 and 71 in selected positions relative to the walls 16, when the walls 16 are moved farther apart or vice versa, for accommodating the supports 70 and 71 thereto, preferably includes two pairs of outwardly-extending, vertically-disposed perforated plates 79, one pair being welded or otherwise fixedly secured at one end portion of each to a like end portion of each support 70 and the other pair being similarly secured to the other end portions of the supports 70. The perforaone end portion of each to a like end portion of each tions 78 of the plates 79 are adapted to align axially with like perforations in the end supports 71. Nut and bolt assemblies 77 may be employed to connect the supports 70 and 71 with the shanks of the bolts extending through selected axially aligned perforations.

Adjustable support means for supporting the supports 70 and 71 in selected positions toward or away from the top wall 16 may comprise the use of vertical rows of spaced-apart perforations 81 in vertical end flanges 82 of the walls 16 (FIG. 2) to receive the shanks of nut-and-bolt assemblies 77, with the shanks also extending through perforations in the end supports 71.

Since the weights of the endless conveyor means and the positioning means described above may be quite heavy, we prefer to provide means 85 to assist in manual raising of this structure. In FIGS. 1 and 7 there are shown mechanical means for the purpose. Such means is shown, by way of example, as conventional spring-urged elevators, including cables 86 attached, as by eye bolts 87, to the elongated channel iron supports 70 and extending upwardly where they are operatively connected to coil springs 88 for winding up the cables. The winding-up mechanism may be carried by suitable housings 89 secured to the upper portions of the walls 16 to project outwardly therefrom.

Guide and baffle means 90 (FIGS. 2, 3 and 8) for the dual functions of guiding or orienting the portions C, D and E in their path through the housing 15 comprises an elongate channel member 91 extending the full length of the housing 15, having a substantially flat upper wall 92 wider than the outer diameter of the conduit 45 (as may be seen in FIG. 3) from which depends a pair of flanges 93, preferably integral therewith. The upper portions of the flanges are in substantial parallelism, one with the other, and they then converge downwardly as at 94, providing at their lower converging end, a slot defined by the lowermost portions 95 of the flanges. The slot opens downwardly. Preferably, the channel member 91 is of smooth surfaced metal, as steel. It may be detachably secured to the central top wall section 21 as by screws 96, with the shanks thereof extending into screw-threaded bores in the section 21 and upper wall 92. This channel member 91 confines the flow of impregnating or coating fluid as it leaves the mouths 46 so that it is not dissipated in paths outwardly of the outer faces of the members C while in the compartment 18. It also guides and tends to orient the sections C throughout all three compartments 18, 19 and 20, since the upper portion of the sections C are retained within the slot defined by the lowermost portions 95 of the flanges, thus cooperating with the plates or links 61 of the conveyor chain 60.

With special reference to the heat-drying compartment 20, we prefer to cover the inner faces of the walls 16 of this compartment with asbestos 100 and apply heat-reflecting coatings 101 on the exposed asbestos surfaces.

Means for heat-drying the impregnated or coated and drip-dried sections D from the compartment 19 may comprise a plurality of suitable conventional infra-red heat units 105. Six of these may be arranged over each inner face of the coated walls 16 in horizontal rows, with the longitudinal axes of the units being preferably vertical, and the units staggered in the two rows. The units of each row may be disposed 15 inches apart in the row.

Referring to the wiring diagram of FIG. 10, the conductors 106 are electrically connected with heads 107–109 which are electrically connected with all of the units 105, and with the electric motor 110 by lead 111 for conventionally driving the pump 56, and by lead 112 with the electric motor 73 which drives the shaft 65. The conductor 113 is electrically connected as by leads and conductors 113–119 with the units 105 and by lead 120 with the motor 73 and by leads 120 and 121 with the motor 110. Interposed in the conductor 113 may be a conventional manually operated electric switch 123, between conductor 113 and lead 114, another conventional manually operated electric switch 124, between leads 117 and 120, another conventional manually operated electric switch 125, interposed in lead 120, a conventional manually operated electric switch 126 as well as a manually-operated electric switch 127 between the leads 120 and 121. We prefer to provide electrical contactors 128 and 129, one between the leads 117 and 118 and one between the leads 109 and 115. The contactors may be any one of the well known electromechanical devices for repeatedly establishing and interrupting the electric circuit through it and which may be manually adjusted as to the intervals of establishment and interruption of the intervals. In addition, we prefer to interpose between the leads 114 and 115 a thermostatic control 130.

FIG. 8 illustrates preferred means for mounting the infra-red units 105 upon the walls 16, and enclosing adjacent portions of the leads to and from the same. Electrically insulated sleeves 135 extend through the walls 16 and their coatings 100 and 101 and mount the units as well as provide housings for the terminals of the leads. The several leads may be housed in suitable elongate boxes 136 mounted upon the outer faces of the walls 16. Slack in the lead permits widening of the space between the walls 16.

FIG. 11 discloses the modification which results in the form B of the invention. Here there is no tank or reservoir, like the tank or reservoir 49 of FIGS. 1 and 2, mounted upon the top wall of the housing, nor is there a pump, like the pump 56 mounted upon a tank or reservoir, but the electric motor-operated pump 140 is disposed below or adjacent the drip-receiving receptacle 141 and the conduit 142 opening into one end of the conduit 143 (which may be substantially like the conduit 45) also opens into the receptacle 141, while a conduit 144 opens into one side of the pump 140 and a conduit 145 opens into the other side of the pump and, extending upwardly, opens into the other end of the conduit 143. Instead of a port in the receptacle 141 for feeding impregnating or coating material therein, the material may be introduced into the open mouth of the receptacle 141. Otherwise the two forms of the invention are substantially the same.

In the operation of either the form A or B of the invention, with the tank or reservoir 48 or the receptacle 141 containing a charge of impregnating or coating material, the motors 73 and 110 in operation, and the infra-red units 112 energized, sections, such as sheet of material C to be impregnated or coated, are fed, one after another, with a short space between the facing edges of the sections, into the impregnating or coating apparatus A or B, with their upper edge portions within the space between the lowermost portions 95 of the guide or orienting and baffle means 90, and the lower edge portions of the sections C disposed on the pivot-pins 62 of the upper run of the endless conveyor chain 60 with this lower portion disposed in the spaces between facing plates of the links 61 and between facing lugs 63.

The impregnating or coating material will descend, either by gravity or, in the case of pressure built up by the pump 56 or 140, under pressure, contact the upper edges of the sections C, flow down the side and end faces of the sections and, if they are of porous material, soak into the material of the members and impregnate. Some of the surplus impregnating or coating material will drain into the receptacle 50 or 141 and, when the sections, which have now become the impregnated or coated sections D, leave the impregnating or coating compartment 18, and enter the drip-dry compartment 19, they will drip dry while they pass therethrough (still guided or oriented by the means 90) with the impregnating or coating material dripping into the receptacle 50 or 141. The sections D will then move into the heat-drying compartment 20 for heat drying, still guided or oriented by the means 90 and finally discharged therefrom as the dried sections E, upon a suitable processed sections-receiving conveyance F, such as a truck.

While moving through all three compartments 18, 19 and 20, the material C, D, and E will be urged along and prevented from accidentally slipping backwardly, in side edge contact, one with another, by the lugs 63 of the plates or links 61.

Both the plates or links 61 and the channel member 91 aid in baffling impregnating or coating material from being splattered on the inner faces of the walls 16 while in the impregnating or coating compartment 18, and the member 91 functions to direct the impregnating or coating material upon the top edges and the sides of the sections C.

In the stead of the conventional metallic infra-red heating elements 105, we may substitute conventional fused quartz in place of the metal. We have discovered that the fused quartz is around 40% more effective.

Preferred heat-reflecting coatings 101 are sheets of polished aluminum with gauge .020 preferred. We have discovered that this material aids materially in conjunction with the heating elements to reflect a desirable heat of substantially 450° F.

It is believed that the steps to be taken to widen or narrow the spacing of the walls 16 and 17 are obvious. It is sometimes desirable to space the infra-red units 105 near or farther away from the sections D because of a relative heavy or light coat applied, or a difference in the ability of the volatile constituents of the impregnating or coating material to evaporate. The apparatus of this invention is adapted to accomplish all these functions as well as others which will not be obvious to those skilled in the art to which this invention pertains.

Various changes in the size, shape and arrangement of parts may be made to the form of invention herein shown and described, without departing from the spirit of the invention or scope of the claims.

What is claimed is:

1. Coating and impregnating apparatus including a substantially horizontally-disposed elongate base top having a slot extending longitudinally from end to end thereof, a housing having side walls supported upon said base top, with their lower portions adjacent said slot and in parallelism therewith; liquid discharge means carried by said housing adjacent the upper portion thereof and within the vertical planes of the longitudinal edges of said slot; a conveyor having means thereon for carrying upwardly extending sheet material, said conveyor being operatively connected with said housing below said liquid discharge means and with portions of said conveyor means extending through said slot; and collection means to collect excess discharge liquid discharged upon sheet material and dripping from said sheet material and through said slot.

2. Coating and impregnating apparatus including a housing having side walls with a flange extending from the end of each side wall, and with the flanges at one end of each wall being in the same vertical plane, and the flanges of the other end of each side wall being in the same vertical plane, each flange having a like vertical row of spaced apart openings; mean between said side walls at their upper ends and carried thereby to discharge a liquid downwardly, including a substantially horizontally-disposed conduit provided with downwardly opening discharge mouths; conveyor means whithin said housing and below said conduit to receive sheets of material to be conveyed through said housing, said conveyor means including an endless conveyor, a pair of wheels over which said endless conveyor is trained, shafts secured to said wheels and extending outwardly of the horizontal planes of said side walls, said shafts being provided with bearings; and means to selectively raise and lower said conveyor means, including a cradle supporting said bearings and provided with elongated horizontal supports disposed longitudinally of and in sliding contact with said side walls, and end supports fixedly secured to the ends of said elongate horizontal supports, said end supports being provided with openings aligning axially with the openings in said flanges and removable rigid means extending through axially aligning openings in said flanges and end supports to support said cradle upon said housing.

3. Coating and impregnating apparatus according to claim 2 characterized in that each of said side walls is provided with a vertically extending elongate slot, with said shafts extending through and outwardly thereof; said conveyor means includes a motor operatively connected with one of said shafts; and said motor is supported by said cradle.

4. Coating and impregnating including an elongate housing having elongate side walls and an elongate top wall defining a continuous uninterrupted space providing a liquid coating compartment, a drip-drying compartment and a heat-dry compartment, said housing being open at both ends and the lower portions of said side walls defining an elongate mouth; supports means for said housing including a base top consisting of two horizontally-disposed elongate, subtantially flat sections, with their inner edges spaced apart and facing one another and defining an elongate slot, aligned with said mouth; an upwardly-opening reservoir below said slot and below said coating and impregnating compartment and drip-dry compartment; heating means in said heat-dry compartment and carried by said side walls; means to selectively move said side walls toward and away from each other; conveyor means for sections of sheet material to travel through all of said compartments from said coating and impregnating compartment and disposed above and aligned longitudinally with said mouth; liquid discharge means adjacent and below said top wall and aligned longitudnally with said mouth to discharge liquid upon said sections of sheet material within said coating and impregnating compartment; and means to convey liquid from said reservoir to said liquid discharge means.

5. Coating and impregnating apparatus, including a housing having side walls and a top wall defining a compartment; conveying means, operatively connected with said housing for conveying upwardly-extending sheet material through said compartment; discharge means, carried by said housing, for discharging liquid upon the sheet material in said compartment, including a substantially horizontally-disposed conduit having a plurality of spaced-apart downwardly opening discharge mouths; and dual function means within said compartment for retaining said sheet material against canting while passing through said compartment and for baffling said liquid away from said top and side walls, comprising an elongate channel member having an upper wall secured to said top wall and a pair of closely spaced-apart flanges extending downwardly from said upper wall and defining a downwardly-opening narrow mouth, with said conduit being disposed within the space between said flanges, and said flanges extending below the horizontal plane of said conduit, whereby portions of sheet material being conveyed by said conveying means will pass through the lower part of the space between said flanges and be restrained from canting by said flanges.

6. Coating and impregnating apparatus including a horizontally elongate housing having walls defining a compartment with said compartment being open at its lower portion; conveyor means, including an endless conveyor, operatively connected with and within said housing for conveying upwardly-extending sheet material through said compartment, with a lower edge of said sheet material upon said conveyor, said conveyor means being provided with pairs of opposite side links joined by link pins, and also provided with dual function means to restrain said sheet material, upon the upper run of said endless conveyor, from sidewise and retrograde movements upon said conveyor, comprising continuations of said links extending therefrom in the same vertical planes as the planes of the side faces of said links and away from the ends of adjacent link pins, and inwardly-extending lugs carried by said continuations and constructed and arranged for the free ends of said lugs to engage said strip material.

References Cited by the Examiner

UNITED STATES PATENTS

| | | | |
|---|---|---|---|
| 1,666,671 | 4/1928 | Speer | 134—125 |
| 1,751,712 | 3/1930 | Owen. | |
| 1,953,300 | 4/1934 | Holman | 198—180 |
| 2,293,858 | 8/1942 | Schafer | 15—77 |
| 2,362,847 | 11/1944 | O'Neil | 34—150 |
| 2,618,813 | 11/1952 | Patton et al. | 134—131 X |
| 2,671,241 | 3/1954 | Starner | 134—72 X |
| 2,791,514 | 5/1957 | Mears | 118—326 X |
| 2,884,898 | 5/1959 | Peterson | 118—324 |
| 3,018,200 | 1/1962 | Huddle | 134—72 X |
| 3,058,572 | 10/1962 | Foster | 198—180 X |
| 3,206,005 | 9/1965 | Lyman | 134—72 |

DANIEL BLUM, *Primary Examiner.*